US012769016B2

(12) United States Patent
Suzuki et al.

(10) Patent No.: US 12,769,016 B2
(45) Date of Patent: Oct. 20, 2026

(54) LIGHT DETECTION DEVICE

(71) Applicant: HAMAMATSU PHOTONICS K.K., Hamamatsu (JP)

(72) Inventors: Takaharu Suzuki, Hamamatsu (JP); Yosuke Suwa, Hamamatsu (JP); Keisuke Nagura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 168 days.

(21) Appl. No.: 18/857,272

(22) PCT Filed: Apr. 10, 2023

(86) PCT No.: PCT/JP2023/014532
§ 371 (c)(1),
(2) Date: Oct. 16, 2024

(87) PCT Pub. No.: WO2023/204079
PCT Pub. Date: Oct. 26, 2023

(65) Prior Publication Data

US 2025/0258306 A1 Aug. 14, 2025

(30) Foreign Application Priority Data

Apr. 21, 2022 (JP) ................................ 2022-069985

(51) Int. Cl.
*G01T 1/20* (2006.01)

(52) U.S. Cl.
CPC ................................ *G01T 1/2018* (2013.01)

(58) Field of Classification Search
CPC ..... G01T 1/20; G01T 1/2018; H10F 39/1898; H10F 39/804; H10F 77/93
See application file for complete search history.

(56) References Cited

U.S. PATENT DOCUMENTS

2006/0231961 A1 10/2006 Shibayama et al.
2016/0141439 A1 5/2016 Nagano et al.
2020/0366853 A1 11/2020 Song et al.

FOREIGN PATENT DOCUMENTS

JP 2000-286275 A 10/2000
JP 2005-072978 A 3/2005
JP 2007-009022 A 1/2007
JP 2015-000291 A 1/2015
WO WO-2019/059188 A1 3/2019

OTHER PUBLICATIONS

International Preliminary Report on Patentability mailed Oct. 31, 2024 for PCT/JP2023/014532.
European Search Report issued on Oct. 28, 2025 in corresponding European patent application 23791728.1.

*Primary Examiner* — Jurie Yun
(74) *Attorney, Agent, or Firm* — Faegre Drinker Biddle & Reath LLP

(57) ABSTRACT

A light detection device includes a wiring substrate, a light receiving element, at least one connection member, and a film-shaped adhesive member. The mounting region has a pair of first sides and a pair of second sides. The film-shaped adhesive member is disposed in the mounting region. The film-shaped adhesive member includes a main body portion and at least one projecting portion. The main body portion has a pair of first edges extending so as to notch the mounting region on each first side and a pair of second edges extending so as to notch the mounting region on each second side. The at least one projecting portion extends from at least one edge of the pair of first edges and the pair of second edges.

13 Claims, 4 Drawing Sheets

LIGHT DETECTION DEVICE

TECHNICAL FIELD

The present disclosure relates to a light detection device.

BACKGROUND ART

A light detection device including a wiring substrate, a light receiving element mounted on the wiring substrate, and a connection member electrically connecting the wiring substrate and the light receiving element is known (see, for example, Patent Literature 1). For example, in a radiation detection unit used in a CT device or the like, there is a case where a plurality of such light detection devices is arranged in a state where an interval between the light detection devices is reduced.

CITATION LIST

Patent Literature

Patent Literature 1: Japanese Unexamined Patent Publication No. 2015-000291

SUMMARY OF INVENTION

Technical Problem

In the light detection device as described above, a film-shaped adhesive member may be disposed between the wiring substrate and the light receiving element. In such a case, when the film-shaped adhesive member is disposed in the entire region between the wiring substrate and the light receiving element at the time of manufacturing in order to realize stable bonding between the wiring substrate and the light receiving element, the film-shaped adhesive member projects from the region between the wiring substrate and the light receiving element, and it may be difficult to arrange the plurality of light detection devices in a state where the interval between the light detection devices is reduced.

An object of the present disclosure is to provide a light detection device capable of realizing stable bonding between a wiring substrate and a light receiving element while preventing projection of a film-shaped adhesive member.

Solution to Problem

A light detection device according to an aspect of the present disclosure is [1] "A light detection device, including a wiring substrate, a light receiving element mounted on the wiring substrate, a connection member electrically connecting the wiring substrate and the light receiving element, and a film-shaped adhesive member bonding the wiring substrate and the light receiving element, in which a mounting region where the wiring substrate and the light receiving element overlap when viewed from a first direction in which the wiring substrate and the light receiving element are arranged has a pair of first sides facing each other in a second direction perpendicular to the first direction and a pair of second sides facing each other in a third direction perpendicular to the first direction and the second direction, and the film-shaped adhesive member is disposed in the mounting region when viewed from the first direction, and the film-shaped adhesive member includes a main body portion having a pair of first edges extending so as to notch the mounting region on a center side of the mounting region in each of the pair of first sides and a pair of second edges extending so as to notch the mounting region on the center side of the mounting region in each of the pair of second sides, and at least one projecting portion extending from at least one edge of each of the pair of first edges and at least one edge of each of the pair of second edges to a side opposite to a center of the mounting region."

In the light detection device of [1], the film-shaped adhesive member disposed in the mounting region includes a main body portion having a shape notched on each side of the mounting region. This makes it less likely for the film-shaped adhesive member to project from the mounting region at the time of bonding the wiring substrate and the light receiving element. Further, the main body portion of the film-shaped adhesive member extends to each corner portion of the mounting region, and the film-shaped adhesive member disposed in the mounting region further includes at least one projecting portion extending from at least one edge of the main body portion. As a result, the interval between the wiring substrate and the light receiving element is easily kept constant at the time of bonding the wiring substrate and the light receiving element, and as a result, the wiring substrate and the light receiving element are firmly bonded. Therefore, according to the light detection device of [1] described above, it is possible to realize stable bonding between a wiring substrate and a light receiving element while preventing projection of a film-shaped adhesive member.

A light detection device according to an aspect of the present disclosure may be [2] "The light detection device according to [1] described above, in which the at least one projecting portion extends from each of the pair of first edges and each of the pair of second edges to the side opposite to the center of the mounting region." According to the light detection device of [2], stable bonding between the wiring substrate and the light receiving element can be more reliably realized.

A light detection device according to an aspect of the present disclosure may be [3] "The light detection device according to [1] or [2] described above, in which each of the pair of first edges and each of the pair of second edges extends along a curve recessed toward the center side of the mounting region." At the time of bonding the wiring substrate and the light receiving element, the film-shaped adhesive member easily projects at the center of each side of the mounting region, but according to the light detection device of [3], projection of the film-shaped adhesive member at the center of each side of the mounting region can be more reliably prevented.

A light detection device according to an aspect of the present disclosure may be [4] "The light detection device according to any one of [1] to [3] described above, in which the film-shaped adhesive member includes a plurality of projecting portions as the at least one projecting portion, the plurality of projecting portions extending from each of the pair of first edges and each of the pair of second edges to the side opposite to the center of the mounting region." According to the light detection device of [4] described above, it is possible to more reliably realize stable bonding between a wiring substrate and a light receiving element while preventing more reliably projection of a film-shaped adhesive member.

A light detection device according to an aspect of the present disclosure may be [5] "The light detection device according to [4] described above, in which the plurality of projecting portions includes a first projecting portion, and a second projecting portion having a width larger than a width of the first projecting portion." According to the light detection device of [5], when a separator is peeled off from the film-shaped adhesive member at the time of bonding the wiring substrate and the light receiving element, the defect of each projecting portion is suppressed so that stable bonding between the wiring substrate and the light receiving element can be realized. In addition, since the defect of each projecting portion is suppressed, the yield is improved.

A light detection device according to an aspect of the present disclosure may be [6] "The light detection device according to [4] or [5] described above, in which the plurality of projecting portions includes a plurality of third projecting portions extending to the side opposite to the center of the mounting region at a center of each of the pair of first edges and each of the pair of second edges, and a plurality of fourth projecting portions extending to the side opposite to the center of the mounting region on both sides of the center of each of the pair of first edges and each of the pair of second edges, and each of the third projecting portions has a length longer than a length of each of the fourth projecting portions." At the time of bonding the wiring substrate and the light receiving element, the film-shaped adhesive member easily projects at the center of each side of the mounting region, but according to the light detection device of [6], since the retraction amount of each edge of the main body portion increases at the center of each side of the mounting region, projection of the film-shaped adhesive member at the center of each side of the mounting region can be more reliably prevented. Furthermore, when a separator is peeled off from the film-shaped adhesive member at the time of bonding the wiring substrate and the light receiving element, the defect of each projecting portion is suppressed so that stable bonding between the wiring substrate and the light receiving element can be realized. In addition, since the defect of each projecting portion is suppressed, the yield is improved.

A light detection device according to an aspect of the present disclosure may be [7] "The light detection device according to any one of [1] to [6], in which the connection member is each of a plurality of connection members arranged two-dimensionally." According to the light detection device of [7] described above, for example, even in a case where an area sensor is used as a light receiving element, it is possible to realize stable bonding between a wiring substrate and a light receiving element while preventing projection of a film-shaped adhesive member.

A light detection device according to an aspect of the present disclosure may be [8] "The light detection device according to [7], in which the main body portion and the at least one projecting portion overlap the plurality of connection members when viewed from the first direction." According to the light detection device of [8], since each connection member is reinforced by the film-shaped adhesive member, electrical connection between the wiring substrate and the light receiving element by each connection member can be maintained in a reliable state.

A light detection device according to an aspect of the present disclosure may be [9] "The light detection device according to any one of [1] to [8], in which an outer edge of the film-shaped adhesive member is located inside an outer edge of the light receiving element when viewed from the first direction." According to the light detection device of [9], projection of the film-shaped adhesive member can be more reliably prevented.

A light detection device according to an aspect of the present disclosure may be "The light detection device according to any one of [1] to [9], in which a distance between the pair of second sides is larger than a distance between the pair of first sides." According to the light detection device of described above, for example, even in a case where a rectangular plate-shaped sensor using its longitudinal direction as the third direction is used as a light receiving element, it is possible to realize stable bonding between a wiring substrate and a light receiving element while preventing projection of a film-shaped adhesive member.

A light detection device according to an aspect of the present disclosure may be "The light detection device according to [10], in which at least one slit extending from each of the pair of second edges to the center side of the mounting region is formed in the main body portion." According to the light detection device of [11], the length of the slit can be sufficiently secured in the pair of second edges having the interval larger than the interval between the pair of first edges, and the projection of the film-shaped adhesive member on each second side of the mounting region can be more reliably prevented. In addition, while sufficiently securing the length of the slit, when a separator is peeled off from the film-shaped adhesive member at the time of bonding the wiring substrate and the light receiving element, the defect of the main body portion is suppressed. Therefore, stable bonding between the wiring substrate and the light receiving element can be realized.

A light detection device according to an aspect of the present disclosure may be "The light detection device according to any one of [1] to [11], in which the film-shaped adhesive member is an anisotropic conductive film." According to the light detection device of [12], electrical connection between the wiring substrate and the light receiving element by each connection member can be maintained in a reliable state.

A light detection device according to an aspect of the present disclosure may be "The light detection device according to any one of [1] to [12], further including a protection member extending along an outer edge of a region between the wiring substrate and the light receiving element." According to the light detection device of [13], it is possible to suppress the occurrence of damage such as a defect in the light receiving element.

Advantageous Effects of Invention

According to the present disclosure, it is possible to provide a light detection device capable of realizing stable bonding between a wiring substrate and a light receiving element while preventing projection of a film-shaped adhesive member.

DESCRIPTION OF EMBODIMENTS

Figure 1:
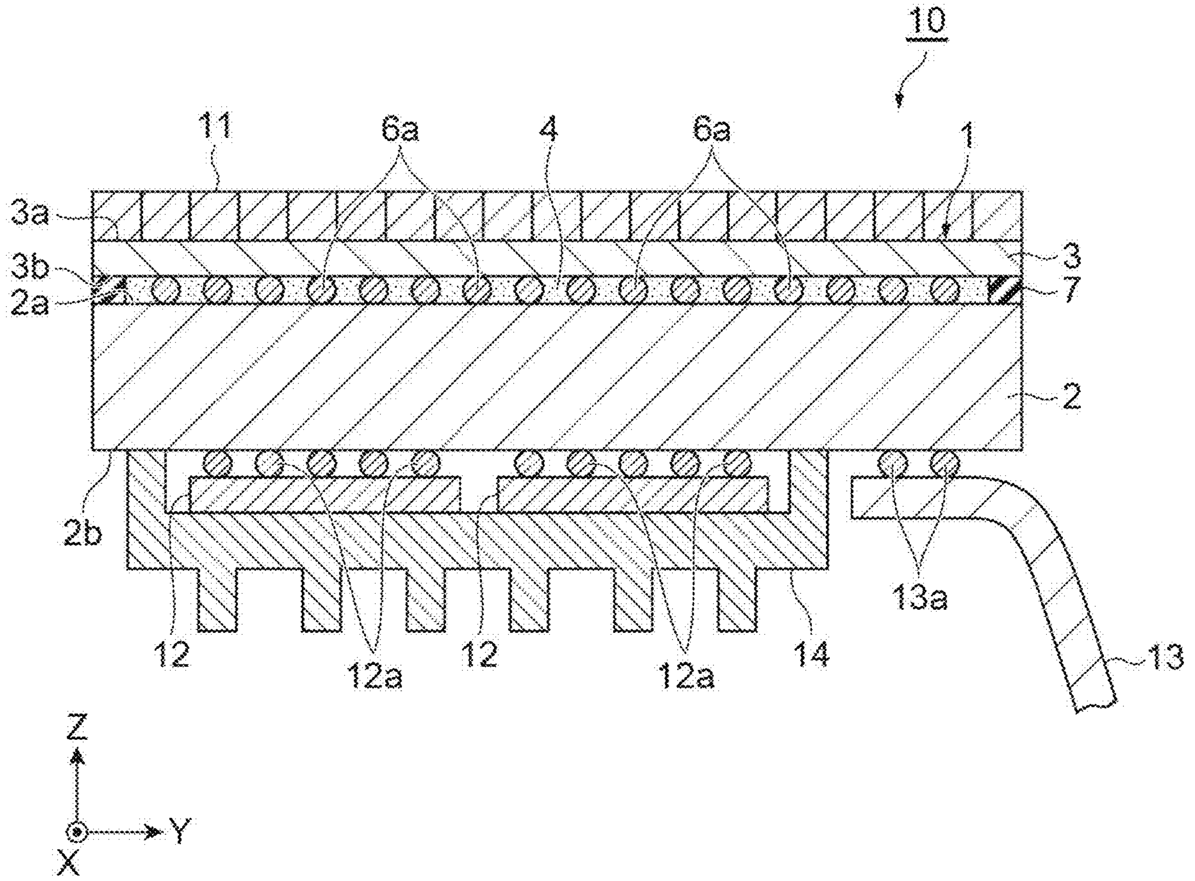
FIG. 1 is a cross-sectional view of a radiation detector including a light detection device according to an embodiment.

Hereinafter, embodiments of the present disclosure will be described in detail with reference to the drawings. In the drawings, the same or corresponding parts are denoted by the same reference signs, and redundant description will be omitted.

[Configuration of Radiation Detector]

As illustrated in FIG. 1, a radiation detector 10 includes a light detection device 1, a scintillator layer 11, a plurality of integrated circuit devices 12, a flexible printed circuit substrate 13, and a heat sink 14. In the radiation detector 10, when radiation (for example, γ-rays, X-rays, and the like) enters the scintillator layer 11, scintillation light is generated in the scintillator layer 11, and the scintillation light is detected by the light detection device 1. The radiation detector 10 is used as a radiation imaging device, for example, in a medical radiological imaging apparatus, a non-destructive inspection apparatus, or the like.

The light detection device 1 includes a wiring substrate 2, a light receiving element 3, a film-shaped adhesive member 4, a plurality of first connection members 6*a*, a plurality of second connection members 6*b* (see FIGS. 2 and 3), and a protection member 7. The wiring substrate 2 has a front surface 2*a* and a back surface 2*b*. The light receiving element 3 has a front surface 3*a* and a back surface 3*b*. The light receiving element 3 is mounted on the front surface 2*a* of the wiring substrate 2 with the back surface 3*b* of the light receiving element 3 facing the front surface 2*a* of the wiring substrate 2. The light receiving element 3 is a backside incidence type area sensor including a plurality of photodiodes (photoelectric conversion regions) arranged two-dimensionally. Hereinafter, the first direction in which a wiring substrate and a light receiving element are arranged is referred to as a Z direction, the second direction perpendicular to the first direction is referred to as an X direction, and the third direction perpendicular to the first direction and the second direction is referred to as a Y direction.

The plurality of connection members 6*a* and 6*b* electrically connect the wiring substrate 2 and the light receiving element 3. Specifically, the plurality of connection members 6*a* and 6*b* electrically and physically connect the plurality of pads provided on the wiring substrate 2 and the plurality of electrodes provided on the light receiving element 3. In the present embodiment, each of the connection members 6*a* and 6*b* is a bump electrode. The film-shaped adhesive member 4 bonds the wiring substrate 2 and the light receiving element 3. In the present embodiment, the film-shaped adhesive member 4 is an anisotropic conductive film (ACF). The thickness of the film-shaped adhesive member 4 is, for example, 0.03 to 0.08 mm. The protection member 7 extends along the outer edge of the region between the wiring substrate 2 and the light receiving element 3. In the present embodiment, the protection member 7 surrounds the outer edge of the region between the wiring substrate 2 and the light receiving element 3 in a frame shape. The protection member 7 is formed of, for example, an underfill resin agent.

The scintillator layer 11 is disposed on the front surface 3*a* of the light receiving element 3. The scintillator layer 11 is optically separated for each photodiode included in the light receiving element 3 when viewed from the Z direction. The material of the scintillator layer 11 is, for example, LYSO or the like in a case where a γ-ray is to be detected, and is, for example, CsI, GOS, or the like in a case where an X-ray is to be detected.

The plurality of integrated circuit devices 12 is mounted on the back surface 2*b* of the wiring substrate 2. Each integrated circuit device 12 is electrically and physically connected to the wiring substrate 2 by the plurality of bump electrodes 12*a*. The flexible printed circuit substrate 13 is electrically and physically connected to the wiring substrate 2 by the plurality of bump electrodes 13*a*. In the radiation detector 10, the operation of the light receiving element 3 is controlled by the plurality of integrated circuit devices 12, and the external input of the electric signal and the external output of the electric signal are performed by the flexible printed circuit substrate 13. The heat sink 14 is attached to the back surface 2*b* of the wiring substrate 2 in a state of being in contact with the plurality of integrated circuit devices 12. The heat sink 14 cools each integrated circuit device 12.

[Configuration of Light Receiving Element]

Figure 2:
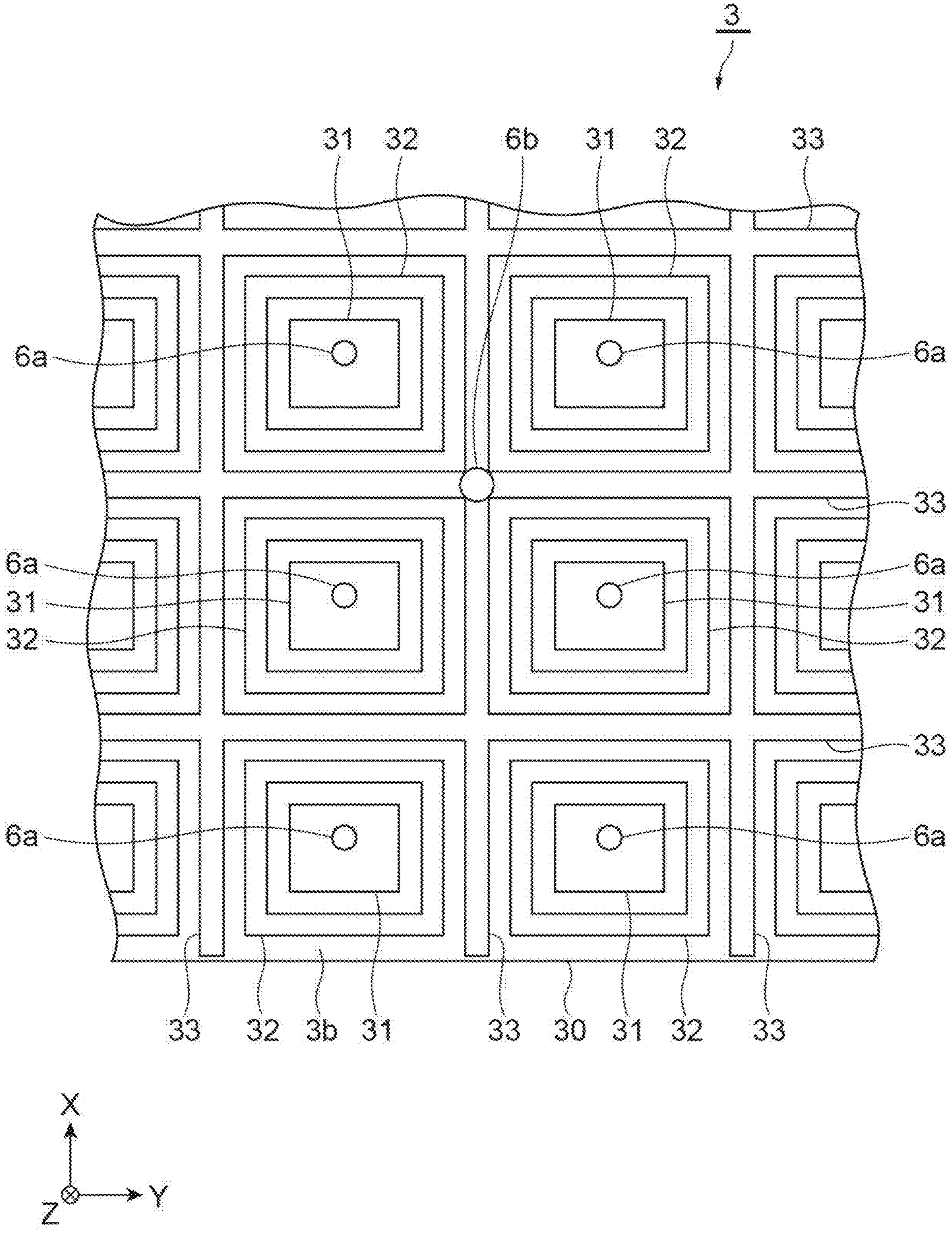
FIG. 2 is a bottom view illustrating a portion of the light receiving element illustrated in FIG. 1.

As illustrated in FIG. 2, the light receiving element 3 includes an n-type semiconductor substrate 30 made of silicon. The thickness of the n-type semiconductor substrate 30 is, for example, 30 to 300 μm. The impurity concentration of the n-type semiconductor substrate 30 is, for example, $1\times10^{12}$ to $1\times10^{15}/cm^3$.

A plurality of p-type regions 31 is formed in a portion of the n-type semiconductor substrate 30 along the back surface 3*b*. The plurality of p-type regions 31 is two-dimensionally arranged with the X direction and the Y direction as a column direction and a row direction. The plurality of p-type regions 31 forms a plurality of pn junction regions with the n-type semiconductor substrate 30. In the light receiving element 3, the plurality of pn junction regions functions as a plurality of photodiodes. The width of each p-type region 31 in the Z direction is, for example, 0.05 to 20 μm. The impurity concentration of each p-type region 31 is, for example, $1\times10^{13}$ to $1\times10^{20}/cm^3$.

A plurality of high-concentration n-type regions 32 is formed in a portion of the n-type semiconductor substrate 30 along the back surface 3*b*. Each of the high-concentration n-type region 32 extends in a frame shape so as to surround each of the p-type region 31 when viewed from the Z direction. The plurality of high-concentration n-type regions 32 electrically isolates the plurality of photodiodes from each other, thereby suppressing occurrence of crosstalk between adjacent photodiodes. The width of each high-concentration n-type region 32 in the Z direction is, for example, 0.1 to several tens of μm. The impurity concentration of each high-concentration n-type region 32 is, for example, $1\times10^{13}$ to $1\times10^{20}/cm^3$.

A p-type region 33 is formed in a portion of the n-type semiconductor substrate 30 along the back surface 3*b*. The p-type region 33 extends in a lattice shape so as to pass between the adjacent high-concentration n-type regions 32 when viewed from the Z direction. The p-type region 33 forms a pn junction region with the n-type semiconductor substrate 30. The width of the p-type region 33 in the Z direction is, for example, 0.05 to 20 μm. The impurity concentration of the p-type region 33 is, for example, $1\times10^{13}$ to $1\times10^{20}/cm^3$.

A plurality of first connection members 6*a* is formed on the back surface 3*b* of the light receiving element 3. Each first connection member 6*a* is formed on each anode electrode (not illustrated) electrically connected to each of the p-type region 31. Each of the anode electrode is formed on the back surface of the n-type semiconductor substrate 30 and is located on each of the p-type region 31. When light enters each photodiode from the front surface 3*a* side, a carrier is generated in each photodiode, and a photocurrent generated by the generation of the carrier is output to the wiring substrate 2 via each of the first connection member 6*a*.

A plurality of second connection members 6*b* is formed on the back surface 3*b* of the light receiving element 3. Each of the second connection member 6*b* is formed on each anode electrode (not illustrated) electrically connected to the plurality of high-concentration n-type regions 32 and p-type regions 33. The cathode electrode is formed on the back surface of the n-type semiconductor substrate 30, and extends in a lattice shape so as to cover the plurality of high-concentration n-type regions 32 and p-type regions 33. The plurality of second connection members 6*b* is formed on a plurality of intersections of the cathode electrodes extending in a lattice shape. However, the plurality of second connection members 6*b* is not formed on all the intersections, but is formed on the plurality of intersections for every predetermined number of intersections in both the X direction and the Y direction (see FIG. 3). Each of the second connection members 6*b* is electrically connected to the ground potential via the wiring substrate 2.

[Configuration of Film-Shaped Adhesive Member]

Figure 3:
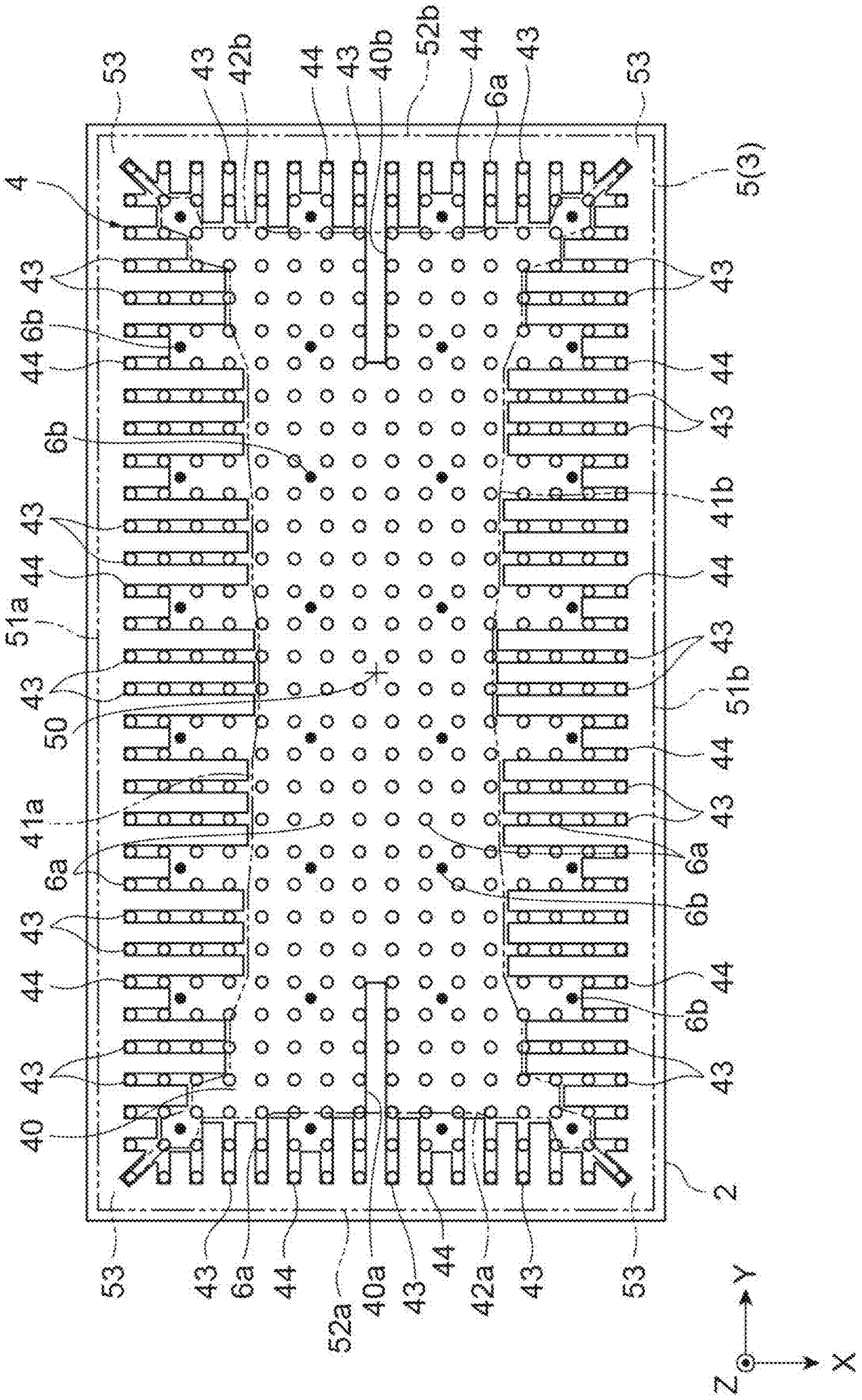
FIG. 3 is a plan view of the light detection device illustrated in FIG. 1.

As illustrated in FIG. 3, the film-shaped adhesive member 4 is disposed in the mounting region 5 when viewed from the Z direction. The mounting region 5 is a region where the wiring substrate 2 overlaps the light receiving element 3 when viewed from the Z direction. In the present embodiment, the mounting region 5 is a region where the back surface 3*b* of the light receiving element 3 (specifically, the back surface of the n-type semiconductor substrate 30) overlaps the front surface 2*a* of the wiring substrate 2 (that is, the mounting surface of the wiring substrate 2) when viewed from the Z direction. In the present embodiment, when viewed from the Z direction, the outer edge of the film-shaped adhesive member 4 is located inside the outer edge of the light receiving element 3. The mounting region 5 has a pair of first sides 51*a* and 51*b* and a pair of second sides 52*a* and 52*b*. The pair of first sides 51*a* and 51*b* face each other in the X direction. The pair of second sides 52*a* and 52*b* face each other in the Y direction. The distance between the pair of second sides 52*a* and 52*b* is larger than the distance between the pair of first sides 51*a* and 51*b*. The length of each of the first sides 51*a* and 51*b* is, for example, 30 to 50 mm. The length of each of the second sides 52*a* and 52*b* is, for example, 15 to 25 mm. In the present embodiment, the mounting region 5 has a rectangular shape with the pair of first sides 51*a* and 51*b* as long sides and the pair of second sides 52*a* and 52*b* as short sides. In the present embodiment, the wiring substrate 2 and the light receiving element 3 also have substantially the same rectangular shape as the mounting region 5 when viewed from the Z direction. In FIG. 3, the light receiving element 3 is indicated by a two-dot chain line, and the protection member 7 is not illustrated.

The film-shaped adhesive member 4 includes a main body portion 40. The main body portion 40 has a pair of first edges 41*a* and 41*b* and a pair of second edges 42*a* and 42*b*. The first edge 41*a* extends on the first side 51*a* toward a center 50 of the mounting region 5 so as to notch the mounting region 5. That is, the first edge 41*a* is located inside with respect to the first side 51*a*. The first edge 41*b* extends on the first side 51*b* toward the center 50 of the mounting region 5 so as to notch the mounting region 5. That is, the first edge 41*b* is located inside with respect to the first side 51*b*. The second edge 42*a* extends on the second side 52*a* toward the center 50 of the mounting region 5 so as to notch the mounting region 5. That is, the second edge 42*a* is located inside with respect to the second side 52*a*. The second edge 42*b* extends on the second side 52*b* toward the center 50 of the mounting region 5 so as to notch the mounting region 5. That is, the second edge 42*b* is located inside with respect to the second side 52*b*. In the present embodiment, each of the edges 41*a*, 41*b*, 42*a*, and 42*b* extends along a curve (for example, a round smooth curve) recessed toward the center 50 of the mounting region 5. The main body portion 40 extends to each of the four corner portions 53 of the mounting region 5. In other words, the main body portion 40 is not notched at each of the four corner portions 53 of the mounting region 5.

The film-shaped adhesive member 4 further includes a plurality of first projecting portions (projecting portions) 43 and a plurality of second projecting portions (projecting portions) 44. The plurality of projecting portions 43 and 44 are formed integrally with the main body portion 40. The second projecting portion 44 has a width larger than the width of the first projecting portion 43. The width of the first projecting portion 43 is the width of the first projecting portion 43 in a direction perpendicular to the direction in which the first projecting portion 43 extends when viewed from the Z direction. The width of the second projecting portion 44 is the width of the second projecting portion 44 in a direction perpendicular to the direction in which the second projecting portion 44 extends when viewed from the Z direction. The width of the first projecting portion 43 is, for example, 0.5 to 2 mm. The width of the second projecting portion 44 is, for example, 1.5 to 6 mm. A slit opening to the side opposite to the main body portion 40 is formed at a distal end portion (end portion on the side opposite to the main body portion 40) of each of the second projecting portions 44. Note that the slit that opens to the side opposite to the main body portion 40 does not need to be formed at the distal end portion of each of the second projecting portions 44.

From the first edge 41*a* of the main body portion 40, the plurality of projecting portions 43 and 44 extends along the X direction to the side opposite to the center 50 of the mounting region 5. From the first edge 41*b* of the main body portion 40, the plurality of projecting portions 43 and 44 extends along the X direction to the side opposite to the center 50 of the mounting region 5. In each of the first edges 41*a* and 41*b*, the plurality of projecting portions 43 and 44 is arranged in the Y direction at predetermined intervals such that the plurality of (for example, two) first projecting portions 43 is positioned between the adjacent second projecting portions 44. The predetermined interval is, for example, 0.5 to 2 mm.

The length of each of the projecting portions 43 and 44 extending from the first edge 41*a* (the length of each of the projecting portions 43 and 44 in the X direction) becomes longer toward the center of the first edge 41*a*. The length of each of the projecting portions 43 and 44 may continuously increase one by one or may gradually increase for multiple units as approaching the center of the first edge 41*a*. The length of each of the projecting portions 43 and 44 extending from the first edge 41*b* (the length of each of the projecting portions 43 and 44 in the X direction) becomes longer toward the center of the first edge 41*b*. The length of each of the projecting portions 43 and 44 may continuously increase one by one or may gradually increase for multiple units as approaching the center of the first edge 41*b*. As described above, each of the plurality of projecting portions 43 and 44 extending to the side opposite to the center 50 of the mounting region 5 at the center of each of the first edges 41*a* and 41*b* (each of the plurality of projecting portions 43 and 44 can be regarded as third projecting portions) has a length longer than the length of each of the plurality of projecting portions 43 and 44 extending to the side opposite to the center 50 of the mounting region 5 on both sides of the center of each of the first edges 41_a_ and 41_b_ (each of the plurality of projecting portions 43 and 44 can be regarded as fourth projecting portions).

From the second edge 42_a_ of the main body portion 40, the plurality of projecting portions 43 and 44 extends along the Y direction to the side opposite to the center 50 of the mounting region 5. From the second edge 42_b_ of the main body portion 40, the plurality of projecting portions 43 and 44 extends along the Y direction to the side opposite to the center 50 of the mounting region 5. In each of the second edges 42_a_ and 42_b_, the plurality of projecting portions 43 and 44 is arranged in the X direction at predetermined intervals such that the plurality of (for example, two) first projecting portions 43 is positioned between the adjacent second projecting portions 44. The predetermined interval is, for example, 0.5 to 2 mm.

The length of each of the projecting portions 43 and 44 extending from the second edge 42_a_ (the length of each of the projecting portions 43 and 44 in the Y direction) becomes longer toward the center of the second edge 42_a_. The length of each of the projecting portions 43 and 44 may continuously increase one by one or may gradually increase for multiple units as approaching the center of the second edge 42_a_. The length of each of the projecting portions 43 and 44 extending from the second edge 42_b_ (the length of each of the projecting portions 43 and 44 in the Y direction) becomes longer toward the center of the second edge 42_b_. The length of each of the projecting portions 43 and 44 may continuously increase one by one or may gradually increase for multiple units as approaching the center of the second edge 42_b_. As described above, each of the plurality of projecting portions 43 and 44 extending to the side opposite to the center 50 of the mounting region 5 at the center of each of the second edges 42_a_ and 42_b_ (each of the plurality of projecting portions 43 and 44 can be regarded as third projecting portions) has a length longer than the length of each of the plurality of projecting portions 43 and 44 extending to the side opposite to the center 50 of the mounting region 5 on both sides of the center of each of the second edges 42_a_ and 42_b_ (each of the plurality of projecting portions 43 and 44 can be regarded as fourth projecting portions).

A pair of slits 40_a_ and 40_b_ is formed in the main body portion 40. The slit 40_a_ extends from the second edge 42_a_ toward the center 50 of the mounting region 5. In the present embodiment, the slit 40_a_ extends along the Y direction from the center of the second edge 42_a_. As an example, the width of the slit 40_a_ in the X direction is equal to a predetermined interval between the projecting portions 43 and 44 adjacent along the second edge 42_a_, and the length of the slit 40_a_ in the Y direction is longer than the length of each of the projecting portions 43 and 44 extending from the second edge 42_a_. The slit 40_b_ extends from the second edge 42_b_ toward the center 50 of the mounting region 5. In the present embodiment, the slit 40_b_ extends along the Y direction from the center of the second edge 42_b_. As an example, the width of the slit 40_b_ in the X direction is equal to a predetermined interval between the projecting portions 43 and 44 adjacent along the second edge 42_b_, and the length of the slit 40_b_ in the Y direction is longer than the length of each of the projecting portions 43 and 44 extending from the second edge 42_b_. In the present embodiment, the film-shaped adhesive member 4 has a point-symmetrical shape with the center 50 of the mounting region 5 as a center of symmetry when viewed from the Z direction.

The main body portion 40 and the plurality of projecting portions 43 and 44 overlap the plurality of connection members 6_a_ and 6_b_ when viewed from the Z direction. Each of the first connection members 6_a_ overlaps the main body portion 40, the first projecting portion 43, or the second projecting portion 44 when viewed from the Z direction. Each of the second connection members 6_b_ overlaps the main body portion 40 or the second projecting portion 44 when viewed from the Z direction. As described above, the film-shaped adhesive member 4 is an anisotropic conductive film. The anisotropic conductive film includes an insulating resin layer functioning as an adhesive layer, and a plurality of conductive particles dispersed in the insulating resin layer. Therefore, conductive particles are brought into contact with each other only in a portion of the film-shaped adhesive member 4 pressed by each of the connection members 6_a_ and 6_b_ to achieve conduction. Therefore, the plurality of connection members 6_a_ and 6_b_ are electrically isolated from each other. Note that, in FIG. 3, each of the first connection members 6_a_ is indicated by dots whose color is white, and each of the second connection members 6_b_ is indicated by dots whose color is black.

[Method for Manufacturing Light Detection Device]

A method for manufacturing the light detection device 1 will be described. First, the wiring substrate 2, the light receiving element 3 in which the plurality of connection members 6_a_ and 6_b_ are formed on the back surface 3_b_, and the film-shaped adhesive member 4 in which the separator is attached to one front surface are prepared. The plurality of connection members 6_a_ and 6_b_ are formed on a plurality of electrodes provided in the light receiving element 3. Subsequently, the film-shaped adhesive member 4 is attached to the front surface 2_a_ of the wiring substrate 2 in a state where the separator is attached to one front surface of the film-shaped adhesive member 4. Subsequently, the separator is peeled off from the film-shaped adhesive member 4.

Subsequently, the light receiving element 3 is disposed on the wiring substrate 2 via the film-shaped adhesive member 4 such that the plurality of connection members 6_a_ and 6_b_ formed on the back surface 3_b_ of the light receiving element 3 are positioned on the plurality of pads provided on the wiring substrate 2. Subsequently, the light receiving element 3 is pressed against the wiring substrate 2 at a predetermined heating temperature. As a result, the plurality of pads provided on the wiring substrate 2 and the plurality of electrodes provided on the light receiving element 3 are electrically and physically connected by the plurality of connection members 6_a_ and 6_b_, and the wiring substrate 2 and the light receiving element 3 are bonded by the film-shaped adhesive member 4. Subsequently, an underfill resin agent is applied along the outer edge of the region between the wiring substrate 2 and the light receiving element 3 to form the protection member 7. As described above, the light detection device 1 is obtained.

The plurality of connection members 6_a_ and 6_b_ may be formed on the front surface 2_a_ of the wiring substrate 2 when the wiring substrate 2, the light receiving element 3, and the film-shaped adhesive member 4 are prepared. Alternatively, when the wiring substrate 2, the light receiving element 3, and the film-shaped adhesive member 4 are prepared, a part of each of the connection members 6_a_ and 6_b_ may be formed on the front surface 2_a_ of the wiring substrate 2, and the rest of each of the connection members 6_a_ and 6_b_ may be formed on the back surface 3_b_ of the light receiving element 3. Further, the film-shaped adhesive member 4 may be attached to the back surface 3_b_ of the light receiving element 3 in a state where the separator is attached to one front surface of the film-shaped adhesive member 4.

[Functions and Effects]

In the light detection device 1, the film-shaped adhesive member 4 disposed in the mounting region 5 includes a main body portion 40 having a shape notched on each of the sides 51*a*, 51*b*, 52*a*, and 52*b* of the mounting region 5. This makes it less likely for the film-shaped adhesive member 4 to project from the mounting region 5 at the time of bonding the wiring substrate 2 and the light receiving element 3. Further, the main body portion 40 of the film-shaped adhesive member 4 extends to each corner portion 53 of the mounting region 5, and the film-shaped adhesive member 4 disposed in the mounting region 5 includes a plurality of projecting portions 43 and 44 extending from the edges 41*a*, 41*b*, 42*a*, and 42*b* of the main body portion 40. As a result, the interval between the wiring substrate 2 and the light receiving element 3 is easily kept constant at the time of bonding the wiring substrate 2 and the light receiving element 3, and as a result, the wiring substrate 2 and the light receiving element 3 are firmly bonded. Even if one of the wiring substrate 2 and the light receiving element 3 is inclined with respect to the other at the time of bonding the wiring substrate 2 and the light receiving element 3, and the pressure required for bonding becomes uneven, the wiring substrate 2 and the light receiving element 3 are firmly bonded. Therefore, according to the light detection device 1, it is possible to realize stable bonding between the wiring substrate 2 and the light receiving element 3 while preventing projection of the film-shaped adhesive member 4.

In the light detection device 1, each of the edges 41*a*, 41*b*, 42*a*, and 42*b* of the main body portion 40 extends along a curve recessed toward the center 50 of the mounting region 5. At the time of bonding the wiring substrate 2 and the light receiving element 3, the film-shaped adhesive member 4 easily projects at the center of each of the sides 51*a*, 51*b*, 52*a*, and 52*b* of the mounting region 5, but according to the above-described configuration, projection of the film-shaped adhesive member 4 at the center of each of the sides 51*a*, 51*b*, 52*a*, and 52*b* of the mounting region 5 can be more reliably prevented.

In the light detection device 1, the second projecting portion 44 has a width larger than the width of the first projecting portion 43 at each of the edges 41*a*, 41*b*, 42*a*, and 42*b* of the main body portion 40. As a result, when a separator is peeled off from the film-shaped adhesive member 4 at the time of bonding the wiring substrate 2 and the light receiving element 3, the defect of each of the projecting portions 43 and 44 is suppressed so that stable bonding between the wiring substrate 2 and the light receiving element 3 can be realized. In addition, since the defect of each of the projecting portions 43 and 44 is suppressed, the yield is improved.

In the light detection device 1, each of the plurality of projecting portions 43 and 44 extending to the side opposite to the center 50 of the mounting region 5 at the center of each of the edges 41*a*, 41*b*, 42*a*, and 42*b* of the main body portion 40 has a length longer than the length of each of the plurality of projecting portions 43 and 44 extending to the side opposite to the center 50 of the mounting region 5 on both sides of the center of each of the edges 41*a*, 41*b*, 42*a*, and 42*b* of the main body portion 40. At the time of bonding the wiring substrate 2 and the light receiving element 3, the film-shaped adhesive member 4 easily projects at the center of each of the sides 51*a*, 51*b*, 52*a*, and 52*b* of the mounting region 5, but according to the above-described configuration, since the retraction amount of each of the edges 41*a*, 41*b*, 42*a*, and 42*b* of the main body portion 40 increases at the center of each of the sides 51*a*, 51*b*, 52*a*, and 52*b* of the mounting region 5, projection of the film-shaped adhesive member 4 at the center of each of the sides 51*a*, 51*b*, 52*a*, and 52*b* of the mounting region 5 can be more reliably prevented. Furthermore, when a separator is peeled off from the film-shaped adhesive member 4 at the time of bonding the wiring substrate 2 and the light receiving element 3, the defect of each of the projecting portions 43 44 is suppressed so that stable bonding between the wiring substrate 2 and the light receiving element 3 can be realized. In addition, since the defect of each of the projecting portions 43 and 44 is suppressed, the yield is improved.

In the light detection device 1, the plurality of connection members 6*a* and 6*b* are two-dimensionally arranged. In other words, even in a case where an area sensor is used as the light receiving element 3, it is possible to realize stable bonding between the wiring substrate 2 and the light receiving element 3 while preventing projection of the film-shaped adhesive member 4.

In the light detection device 1, the main body portion 40 and the plurality of projecting portions 43 and 44 overlap the plurality of connection members 6*a* and 6*b* when viewed from the Z direction. As a result, since each of the connection members 6*a* and 6*b* is reinforced by the film-shaped adhesive member 4, electrical connection between the wiring substrate 2 and the light receiving element 3 by each of the connection members 6*a* and 6*b* can be maintained in a reliable state.

In the light detection device 1, when viewed from the Z direction, the outer edge of the film-shaped adhesive member 4 is located inside the outer edge of the light receiving element 3. As a result, projection of the film-shaped adhesive member 4 can be more reliably prevented.

In the light detection device 1, the distance between the pair of second sides 52*a* and 52*b* is larger than the distance between the pair of first sides 51*a* and 51*b*. As a result, even in a case where a rectangular plate-shaped sensor using its longitudinal direction as the Y direction is used as the light receiving element 3, it is possible to realize stable bonding between the wiring substrate 2 and the light receiving element 3 while preventing projection of the film-shaped adhesive member 4.

In the light detection device 1, each of the slits 40*a* and 40*b* is formed in the main body portion 40 so as to extend from each of the second edges 42*a* and 42*b* toward the center 50 of the mounting region 5 at the pair of second edges 42*a* and 42*b* having the interval larger than the interval between the pair of first edges 41*a* and 41*b*. As a result, the length of each of the slits 40*a* and 40*b* can be sufficiently secured, and the projection of the film-shaped adhesive member 4 at each of the second sides 52*a* and 52*b* of the mounting region 5 can be more reliably prevented. In addition, while sufficiently securing the length of each of the slits 40*a* and 40*b*, when a separator is peeled off from the film-shaped adhesive member 4 at the time of bonding the wiring substrate 2 and the light receiving element 3, the defect of the main body portion 40 is suppressed. Therefore, stable bonding between the wiring substrate 2 and the light receiving element 3 can be realized.

In the light detection device 1, the film-shaped adhesive member 4 is an anisotropic conductive film. As a result, electrical connection between the wiring substrate 2 and the light receiving element 3 by each of the connection members 6*a* and 6*b* can be maintained in a reliable state.

In the light detection device 1, the protection member 7 extends along the outer edge of the region between the wiring substrate 2 and the light receiving element 3. As a result, it is possible to suppress the occurrence of damage such as a defect in the light receiving element 3.

[Modifications]

The present disclosure is not limited to the above embodiments. For example, it is sufficient if the film-shaped adhesive member 4 only includes at least one projecting portion (for example, the first projecting portion 43 or the second projecting portion 44) extending from at least one edge of each of the edges 41*a*, 41*b*, 42*a*, and 42*b* of the main body portion 40 to the side opposite to the center 50 of the mounting region 5. Also in this case, as compared with the case where the film-shaped adhesive member 4 does not include at least one projecting portion, it is possible to realize stable bonding between the wiring substrate 2 and the light receiving element 3 while preventing projection of the film-shaped adhesive member 4 for the same reason as in the above-described embodiment. As an example, at least one projecting portion may extend from each of the edges 41*a*, 41*b*, 42*a*, and 42*b* of the main body portion 40 to the side opposite to the center 50 of the mounting region 5.

In the film-shaped adhesive member 4, each of the edges 41*a*, 41*b*, 42*a*, and 42*b* of the main body portion 40 does not need to extend along a curve recessed toward the center 50 of the mounting region 5. For example, each of the edges 41*a*, 41*b*, 42*a*, and 42*b* of the main body portion 40 may extend along a polygonal line recessed toward the center 50 side of the mounting region 5. In the film-shaped adhesive member 4, a plurality of slits 40*a* extending from the second edge 42*a* toward the center 50 of the mounting region 5 may be formed in the main body portion 40. Similarly, in the film-shaped adhesive member 4, a plurality of slits 40*b* extending from the second edge 42*b* toward the center 50 of the mounting region 5 may be formed in the main body portion 40. Alternatively, in the film-shaped adhesive member 4, neither the slit 40*a* nor the slit 40*b* may be formed in the main body portion 40. In addition, the film-shaped adhesive member 4 may be a non-conductive film (NCF). Also in this case, it is possible to realize stable bonding between the wiring substrate 2 and the light receiving element 3 while preventing projection of the film-shaped adhesive member 4.

In the above-described embodiment, the film-shaped adhesive member 4 is disposed in the mounting region 5 when viewed from the Z direction, and the outer edge of the film-shaped adhesive member 4 is located inside the outer edge of the mounting region 5. However, a part of the outer edge of the film-shaped adhesive member 4 may be in contact with the outer edge of the mounting region 5. Further, a part of the outer edge of the film-shaped adhesive member 4 may be positioned outside the outer edge of the mounting region 5. For example, when at least a part of the outer edge of at least one of the wiring substrate 2 and the light receiving element 3 is located outside the outer edge of the mounting region 5 when viewed from the Z direction, in this at least a part, a part of the outer edge of the film-shaped adhesive member 4 may be located outside the outer edge of the mounting region 5.

When viewed from the Z direction, the outer edge of the light receiving element 3 may be located inside the outer edge of the wiring substrate 2, may be located outside the outer edge of the wiring substrate 2, or may coincide with the outer edge of the wiring substrate 2. Furthermore, when viewed from the Z direction, the outer edge of the back surface 3*b* of the light receiving element 3 may be located inside the outer edge of the front surface 2*a* of the wiring substrate 2, may be located outside the outer edge of the front surface 2*a* of the wiring substrate 2, or may coincide with the outer edge of the front surface 2*a* of the wiring substrate 2.

In the above-described embodiment, the length of each of the projecting portions 43 and 44 is longer toward the center of each of the edges 41*a*, 41*b*, 42*a*, and 42*b* of the main body portion 40. However, if each of the plurality of projecting portions 43 and 44 extending to the side opposite to the center 50 of the mounting region 5 at the center of each of the edges 41*a*, 41*b*, 42*a*, and 42*b* of the main body portion 40 has a length longer than the length of each of the plurality of projecting portions 43 and 44 extending to the side opposite to the center 50 of the mounting region 5 on both sides of the center of each of the edges 41*a*, 41*b*, 42*a*, and 42*b* of the main body portion 40, for example, a projecting portion having a short length exists in the center of each of the edges 41*a*, 41*b*, 42*a*, and 42*b* of the main body portion 40.

Figure 4:
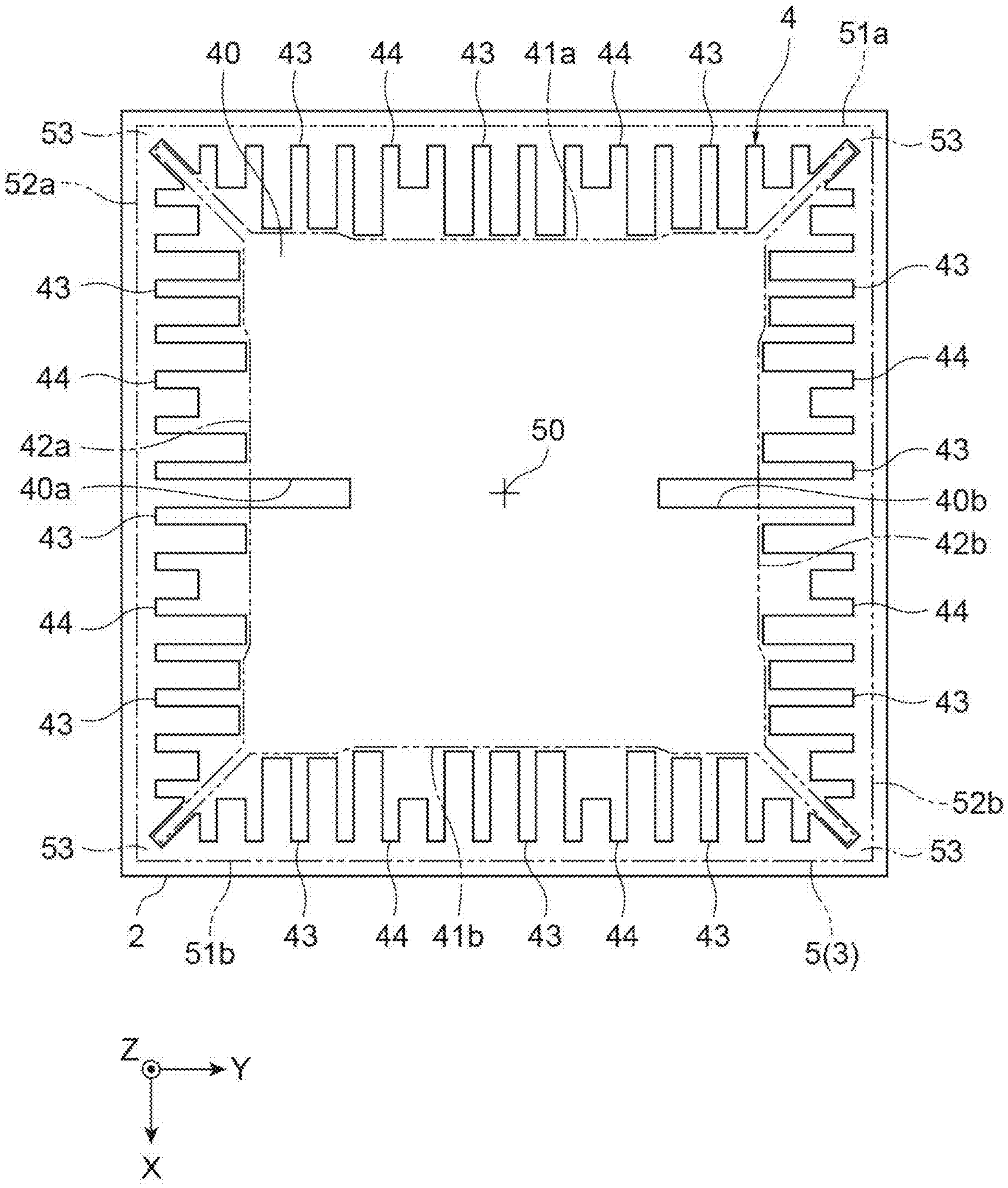
FIG. 4 is a plan view of a film-shaped adhesive member according to a modification.

As illustrated in FIG. 4, in the film-shaped adhesive member 4, the distance between the pair of second sides 52*a* and 52*b* may be equal to the distance between the pair of first sides 51*a* and 51*b*. In the example illustrated in FIG. 4, the mounting region 5 has a square shape.

The light receiving element 3 is not limited to a backside incidence type area sensor, and may be a sensor having a single photodiode. In this case, the number of the connection members 6*a* and 6*b* may be one. Further, each of the connection members 6*a* and 6*b* is not limited to the bump electrode, and may be a metal layer or the like.

REFERENCE SIGNS LIST

1 Light detection device
2 Wiring substrate
3 Light receiving element
4 Film-shaped adhesive member
5 Mounting region
6*a* First connection member (connection member)
6*b* Second connection member (connection member)
40 Main body portion
40*a*, 40*b* Slit
41*a*, 41*b* First edge
42*a*, 42*b* Second edge
43 First projecting portion (projecting portion)
44 Second projecting portion (projecting portion)
50 Center
51*a*, 51*b* First side
52*a*, 52*b* Second side

The invention claimed is:

1. A light detection device, comprising:

a wiring substrate;

a light receiving element mounted on the wiring substrate;

a connection member electrically connecting the wiring substrate and the light receiving element; and a film-shaped adhesive member bonding the wiring substrate and the light receiving element, wherein a mounting region where the wiring substrate and the light receiving element overlap when viewed from a first direction in which the wiring substrate and the light receiving element are arranged has a pair of first sides facing each other in a second direction perpendicular to the first direction and a pair of second sides facing each other in a third direction perpendicular to the first direction and the second direction, the film-shaped adhesive member is disposed in the mounting region when viewed from the first direction, and the film-shaped adhesive member includes:

a main body portion having a pair of first edges extending so as to notch the mounting region on a center side of the mounting region in each of the pair of first sides and a pair of second edges extending so as to notch the mounting region on the center side of the mounting region in each of the pair of second sides; and at least one projecting portion extending from at least one edge of each of the pair of first edges and at least one edge of each of the pair of second edges to a side opposite to a center of the mounting region.

2. The light detection device according to claim 1, wherein the at least one projecting portion extends from each of the pair of first edges and each of the pair of second edges to the side opposite to the center of the mounting region.

3. The light detection device according to claim 1, wherein each of the pair of first edges and each of the pair of second edges extends along a curve recessed toward the center side of the mounting region.

4. The light detection device according to claim 1, wherein the film-shaped adhesive member includes a plurality of projecting portions as the at least one projecting portion, the plurality of projecting portions extending from each of the pair of first edges and each of the pair of second edges to the side opposite to the center of the mounting region.

5. The light detection device according to claim 4, wherein the plurality of projecting portions includes:

a first projecting portion; and a second projecting portion having a width larger than a width of the first projecting portion.

6. The light detection device according to claim 4, wherein the plurality of projecting portions includes:

a plurality of third projecting portions extending to the side opposite to the center of the mounting region at a center of each of the pair of first edges and each of the pair of second edges; and a plurality of fourth projecting portions extending to the side opposite to the center of the mounting region on both sides of the center of each of the pair of first edges and each of the pair of second edges, and each of the third projecting portions has a length longer than a length of each of the fourth projecting portions.

7. The light detection device according to claim 1, wherein the connection member is each of a plurality of connection members arranged two-dimensionally.

8. The light detection device according to claim 7, wherein the main body portion and the at least one projecting portion overlap the plurality of connection members when viewed from the first direction.

9. The light detection device according to claim 1, wherein an outer edge of the film-shaped adhesive member is located inside an outer edge of the light receiving element when viewed from the first direction.

10. The light detection device according to claim 1, wherein a distance between the pair of second sides is larger than a distance between the pair of first sides.

11. The light detection device according to claim 10, wherein at least one slit extending from each of the pair of second edges to the center side of the mounting region is formed in the main body portion.

12. The light detection device according to claim 1, wherein the film-shaped adhesive member is an anisotropic conductive film.

13. The light detection device according to claim 1, further comprising a protection member extending along an outer edge of a region between the wiring substrate and the light receiving element.

* * * * *